US012209935B2

(12) United States Patent
Sohn et al.

(10) Patent No.: US 12,209,935 B2
(45) Date of Patent: Jan. 28, 2025

(54) METHOD OF ESTIMATING DISPLACEMENT OF A BRIDGE AND AN ELECTRONIC DEVICE TO ESTIMATE DISPLACEMENT OF A BRIDGE

(71) Applicant: KOREA ADVANCED INSTITUTE OF SCIENCE AND TECHNOLOGY, Daejeon (KR)

(72) Inventors: Hoon Sohn, Daejeon (KR); Zhanxiong Ma, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 68 days.

(21) Appl. No.: 17/908,410

(22) PCT Filed: Jun. 3, 2021

(86) PCT No.: PCT/KR2021/006978
§ 371 (c)(1),
(2) Date: Aug. 31, 2022

(87) PCT Pub. No.: WO2021/256749
PCT Pub. Date: Dec. 23, 2021

(65) Prior Publication Data
US 2023/0105833 A1  Apr. 6, 2023

(30) Foreign Application Priority Data

Jun. 15, 2020 (KR) .................. 10-2020-0072048

(51) Int. Cl.
*G01M 5/00* (2006.01)
(52) U.S. Cl.
CPC ........ *G01M 5/0008* (2013.01); *G01M 5/0041* (2013.01)

(58) Field of Classification Search
CPC ............ G01M 5/0008; G01M 5/0041; G01M 5/0066; G01M 5/0075; G06F 17/17;
(Continued)

(56) References Cited

U.S. PATENT DOCUMENTS

| 8,618,934 B2 * | 12/2013 | Belov ................. G01M 5/0008 |
| | | 307/151 |
| 11,221,284 B2 * | 1/2022 | Anderson ................ G01N 3/08 |
| 2019/0243935 A1 * | 8/2019 | Yi ........................ G01M 5/0008 |

FOREIGN PATENT DOCUMENTS

| CN | 108197339 B * | 7/2021 | ............ G01B 21/02 |
| KR | 10-1520231 B1 | 5/2015 | |

(Continued)

OTHER PUBLICATIONS

Park, J.-W., Sim, S.-H., & Jung, H.-J. (2013). Displacement Estimation Using Multimetric Data Fusion. IEEE/ASME Transactions on Mechatronics, 18(6), 1675-1682. https://doi.org/10.1109/TMECH.2013.2275187 (Year: 2013).*

(Continued)

*Primary Examiner* — Alvaro E Fortich
*Assistant Examiner* — Martin Walter Braunlich
(74) *Attorney, Agent, or Firm* — Womble Bond Dickinson (US) LLP

(57) ABSTRACT

In a method of estimating displacement of a bridge, a first displacement including a low frequency component and a first high frequency component is generated based on a strain that is measured by a plurality of pairs of strain gauges installed at positions in a first direction from a reference point, in a bridge, a second displacement including a second high frequency component is generated based on an acceleration that is measured by an accelerometer installed at a first position spaced apart from the reference point by a first distance in the first direction, in the bridge, and a final displacement of the bridge is generated based on an
(Continued)

unknown parameter associated with the displacement, the low frequency component and the second high frequency component. The unknown parameter is generated by applying a recursive least square algorithm to the first high frequency component and the second high frequency component.

17 Claims, 14 Drawing Sheets

(58) Field of Classification Search
CPC .......... G01B 21/32; G01B 7/16; G01H 17/00; G01P 15/00; G01P 15/02; G01P 7/00; G01N 2203/0069; G01N 2203/0075
See application file for complete search history.

(56) References Cited

FOREIGN PATENT DOCUMENTS

| KR | 10-2017-0008410 A | 1/2017 |
| KR | 10-1803503 B1 | 11/2017 |
| KR | 10-1880193 B1 | 7/2018 |

OTHER PUBLICATIONS

Tosi, D., Olivero, M., & Perrone, G. (2009). Dynamic strain measurement system with fiber Bragg gratings and noise mitigation techniques. Measurement Science & Technology, 20(6), 065203-065203 (9). https://doi.org/10.1088/0957-0233/20/6/065203 (Year: 2009).*
English machine translation of CN-108197339-B (Year: 2021).*
Bong-Man Ahn, et al., 'An Approximated RLS Algorithm for Adaptive Parameter Estimation', 2007 The Journal of Korean Institute of Communications and Information Sciences vol. 32, No. 9, p. 922-928.
Sung-Han Sim, et al., "Displacement Estimation of a Bridge by Using Combination of Acceleration and Strain Data", 2014 Journal of KSNVE, vol. 24 No. 4, p. 14-17.

* cited by examiner

METHOD OF ESTIMATING DISPLACEMENT OF A BRIDGE AND AN ELECTRONIC DEVICE TO ESTIMATE DISPLACEMENT OF A BRIDGE

BACKGROUND

1. Technical Field

Embodiments relate to displacement estimation, and more particularly relate to a method of estimating displacement of a bridge based on a strain and an acceleration of the bridge and an electronic device to perform the method.

2. Description of the Related Art

Durability of a civil engineering structure, especially a bridge may be degraded due to loads of cars or wind. Degradation of the durability, in a concrete bridge, results in cracks in concrete, and it is very important to discover the cracks in advance. However, discovering the cracks with visual inspection requires much time and great human resource and it is difficult to evaluate depth of the cracks and influence due to the cracks. When the cracks occur in the bridge, a neutral point of the bridge is changed. The neutral point of the bridge denotes a position at which a strain is zero in a cross-section.

Generally, because an upper portion of the bridge experiences compression and a lower portion of the bridge experiences a tension, a neutral point of the bridge is estimated by installing strain gauges at an upper face and a lower face of the bridge.

In addition, an unknown parameter is estimated by a transforming a strain measured by the strain gauges into a frequency domain, errors exists in view of a frequency domain.

SUMMARY

Example embodiments provide a method of estimating displacement of a bridge, capable of enhancing accuracy.

Example embodiments provide an electronic device to estimate displacement of a bridge, capable of enhancing accuracy.

According to example embodiments, in a method of estimating displacement of a bridge, a first displacement including a low frequency component and a first high frequency component is generated based on a strain that is measured by a plurality of pairs of strain gauges installed at a plurality of positions in a first direction from a reference point, in a bridge, a second displacement including a second high frequency component is generated based on an acceleration that is measured by an accelerometer installed at a first position spaced apart from the reference point by a first distance in the first direction, in the bridge, and a final displacement of the bride is generated based on an unknown parameter associated with the displacement, the low frequency component of the first displacement and the second high frequency component of the second displacement. The unknown parameter is generated by applying a recursive least square (RLS) algorithm to the first high frequency component of the first displacement and the second high frequency component of the second displacement.

For generating the first displacement, sub strains are measured by the plurality of pairs of strain gauges, the measured sub strains are transformed into sub displacements, the first displacement is generated based on the sub displacements, the low frequency component of the first displacement is obtained by applying a low-pass filter to the first displacement, and the first high frequency component of the first displacement is obtained by extracting the low frequency component from the first displacement.

For generating the second displacement, the acceleration is measured by the accelerometer, the measured acceleration is double-integrated and the second high frequency component of the second displacement is obtained by applying a high-pass filter to the double-integrated acceleration.

For generating the final displacement, the RLS algorithm is applied to the first high frequency component of the first displacement and the second high frequency component of the second displacement, the unknown parameter is estimated based on a result of the RLS algorithm, and the final displacement is provided by performing an operation based on the low frequency component of the first displacement, the unknown parameter and the second high frequency component of the second displacement.

According to example embodiments, in a method of estimating displacement of a bridge, sub strains are measured by a plurality of pairs of strain gauges installed at a plurality of positions in a first direction from a reference point, in a bridge, the sub strains are transformed into sub displacements, a low frequency component of the first displacement is obtained by applying a low-pass filter to the first displacement, a first high frequency component of the first displacement is obtained by extracting the low frequency component from the first displacement, an acceleration is measured by an accelerometer installed at a first position spaced apart by a first distance from the reference point in the first direction, in the bridge, the measured acceleration is double-integrated, a second high frequency component of the second displacement is obtained by applying a high-pass filter to the double-integrated acceleration, the RLS algorithm is applied to the first high frequency component of the first displacement and the second high frequency component of the second displacement, an unknown parameter associated with the displacement is estimated based on a result of the RLS algorithm and a final displacement of the bride is generated by performing an operation based on the low frequency component of the first displacement, the unknown parameter and the second high frequency component of the second displacement.

According to example embodiments, an electronic device to estimate displacement of a bridge, includes a communication circuit, a control circuit and a display. The communication circuit communicates with a plurality of pairs of strain gauges and an accelerometer and receives a strain that is measured by the plurality of pairs of strain gauges and an acceleration that is measured by the accelerometer. The plurality of pairs of strain gauges are installed at a plurality of positions in a first direction from a reference point, in the bridge and the accelerometer is installed at a first position spaced apart by a first distance from the reference point in the first direction, in the bridge. The control circuit receives the strain and the acceleration from the communication circuit and estimates a final displacement of the bridge based on the strain and the acceleration. The display receive the estimated final displacement from the control circuit and displays the estimated final displacement. The control circuit generates a first displacement including a low frequency component and a first high frequency component based on the strain, generates a second displacement including a second high frequency component based on the acceleration, generates an unknown parameter associated with the displacement by applying a recursive least square (RLS) algorithm to the first high frequency component of the first displacement and the second high frequency component of the second displacement, and generates the final displacement of the bride based on the unknown parameter, the low frequency component of the first displacement and the second high frequency component of the second displacement.

Accordingly, the method of estimating displacement of a bridge and the electronic according to example embodiments may estimate a displacement of a bridge more accurately because the scaling factor is estimated in a time domain instead of a frequency domain with using RLS algorithm in estimating a displacement and the estimated displacement and the estimated scaling factor are not affected by an accuracy of a natural frequency.

BRIEF DESCRIPTION OF THE DRAWINGS

The above and other features of the present disclosure will become more apparent by describing in detail embodiments thereof with reference to the accompanying drawings.

DETAILED DESCRIPTION OF THE EMBODIMENTS

Figure 1:
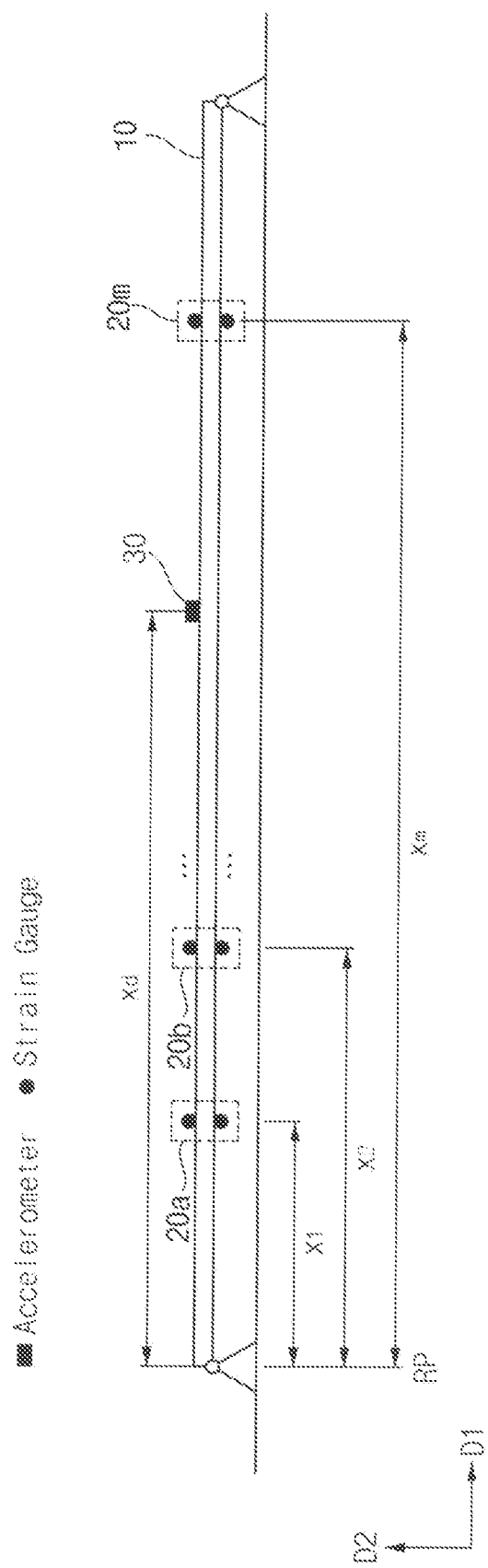
FIG. 1 illustrates that a plurality of pairs of strain gauges and an accelerometer are installed in a bridge according to a method of estimating a displacement of a bridge according to example embodiments.

It will be understood that, although the terms first, second, third etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of example embodiments.

It will be understood that when an element or layer is referred to as being "connected to" or "coupled to" another element, it can be directly on, connected or coupled to the other element or intervening elements or layers may be present. In contrast, when an element is referred to as being "directly on," "directly connected to" or "directly coupled to" another element, there are no intervening elements present. Like or similar reference numerals refer to like or similar elements throughout. As used herein, the term "and/or" includes any and all combinations of one or more of the associated listed items.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises", "includes", "including", and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments will be described more fully hereinafter with reference to the accompanying drawings, in which various embodiments are shown.

FIG. 1 illustrates that a plurality of pairs of strain gauges and an accelerometer are installed in a bridge according to a method of estimating a displacement of a bridge according to example embodiments.

Referring to FIG. 1, a plurality of pairs of strain gauges $20a, 20b, \ldots, 20m$ are installed at a plurality of positions $x1, x2, \ldots, xm$ in a first direction D1 from a reference point RP in a bridge 10 and an accelerometer 30 is installed at a first position spaced apart from the reference point RP by a first distance xd in the first direction D1 in the bridge 10.

Each of the plurality of pairs of strain gauges $20a, 20b, \ldots, 20m$ may include a first strain gauge and a second strain gauge that are spaced apart from each other at one of the plurality positions $x1, x2, \ldots, xm$ by a second distance in a second direction D2 perpendicular to the first direction D1.

Strain that is measured by plurality of pairs of strain gauges $20a, 20b, \ldots, 20m$ may be transformed into a first displacement, an acceleration that is measured by the accelerometer 30 may be transformed a second displacement and a displacement of the bridge 10 may be estimated by combining the first displacement and the second displacement.

Figure 2:
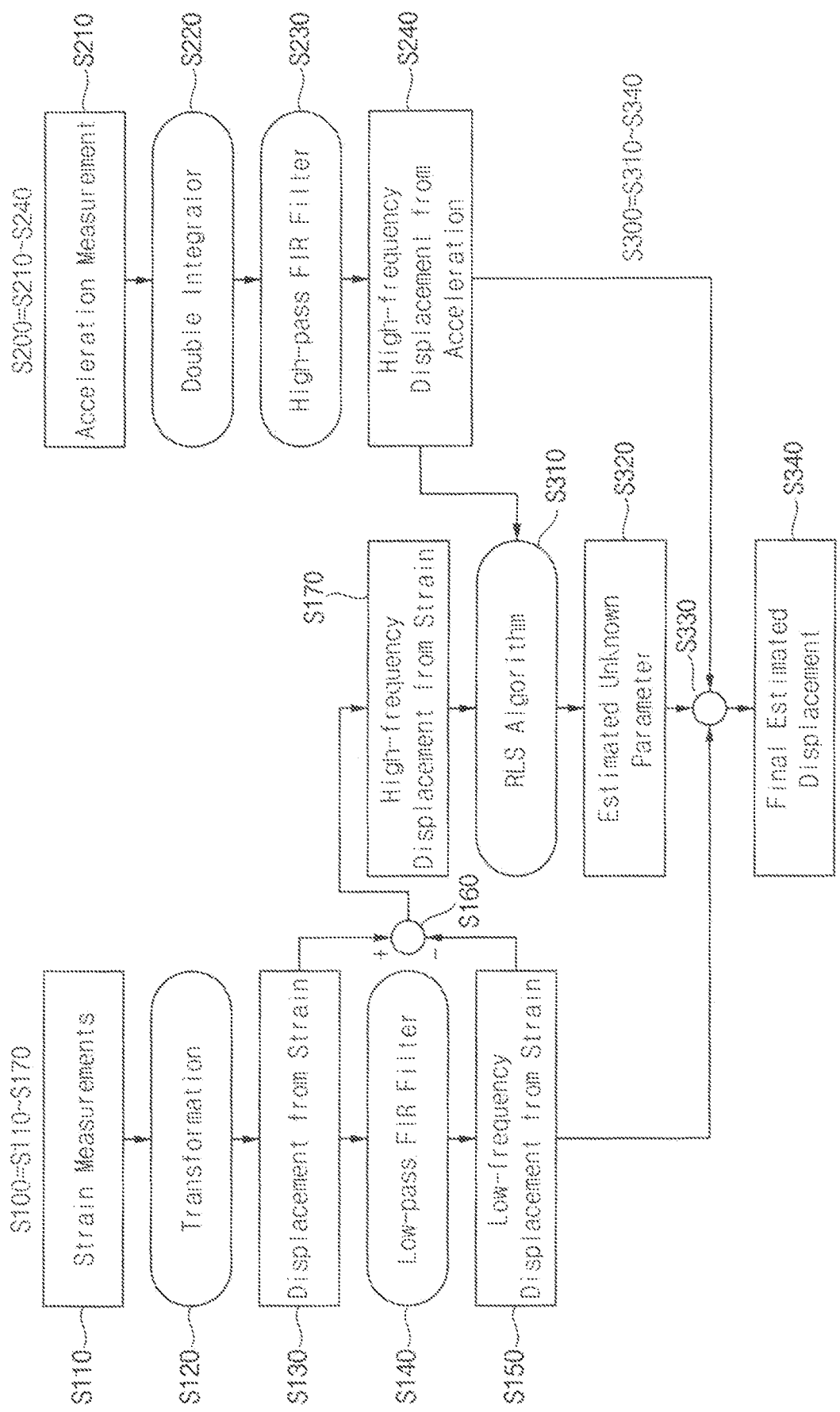
FIG. 2 is a flow chart illustrating a method of estimating displacement of a bridge according to example embodiments.

FIG. 2 is a flow chart illustrating a method of estimating displacement of a bridge according to example embodiments.

Referring to FIGS. 1 and 2, a first displacement including a low frequency component and a first high frequency component is generated (i.e., calculated) based on a strain that is measured by a plurality of pairs of strain gauges 20a, 20b, ..., 20m installed at a plurality of positions x1, x2, ..., xm in a first direction D1 from a reference point RP, in the bridge 10 (operation S100).

A second displacement including a second high frequency component is generated based on an acceleration that is measured by an accelerometer 20 installed at a first position spaced apart from the reference point RP by a first distance xd in the first direction D1 in the bridge 10 (operation S200).

A final displacement of the bridge 10 is generated based on an unknown parameter associated with the displacement, the low frequency component of the first displacement and the second high frequency component of the second displacement (operation S300). The unknown parameter may be generated by applying a recursive least square (RLS) algorithm to the first high frequency component of the first displacement and the second high frequency component of the second displacement.

For generating the first displacement (operation S100), sub strains are measured by the plurality of pairs of strain gauges 20a, 20b, ..., 20m (operation S110), the measured sub strains are transformed into sub displacements (operation S120), the first displacement is generated based on the sub displacements (operation S130), the low frequency component of the first displacement (i.e., low frequency displacement) is obtained (operation S150) by applying a low-pass filter to the first displacement (operation S140), and the first high frequency component of the first displacement (i.e., high frequency displacement) is obtained (operation S170) by extracting the low frequency component from the first displacement (operation S160).

For generating the second displacement (operation S200), the acceleration is measured by the accelerometer 20 (operation S210), the measured acceleration is double-integrated (operation S220) and the second high frequency component of the second displacement (i.e., high frequency displacement) is obtained (operation S240) by applying a high-pass (FIR) filter to the double-integrated acceleration (operation S230).

For generating the final displacement (operation S300), the RLS algorithm is applied to the first high frequency component of the first displacement and the second high frequency component of the second displacement (operation S310), the unknown parameter is estimated based on a result of the RLS algorithm (operation S320), and the final (estimated) displacement is provided (operation S340) by performing an operation based on the low frequency component of the first displacement, the unknown parameter and the second high frequency component of the second displacement (operation S330).

In embodiments, the final displacement may be obtained by dividing the low frequency component of the first displacement by the estimated unknown parameter and by summing the second high frequency component of the second displacement to a result of the dividing.

In embodiments, the estimated unknown parameter may correspond to a scaling factor associated with compensating for a difference between an estimated mode shape of the bridge and a real mode shape of the bridge 10.

Figure 3:
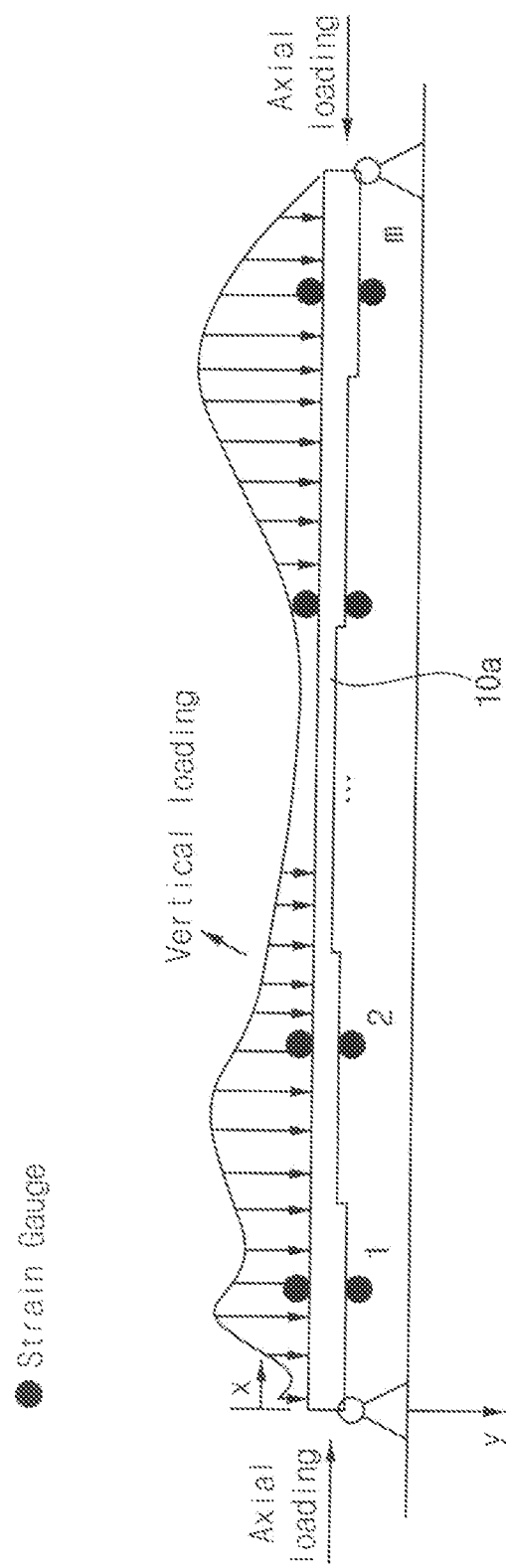
FIG. 3 illustrates axial loading and vertical loading that a real bridge having a varying cross-section experiences.

FIG. 3 illustrates axial loading and vertical loading that a real bridge having a varying cross-section experiences.

Referring to FIG. 3, a bridge 10a may have a varying cross-section and the bridge 10a may experience axial loading and vertical loading.

Figure 4:
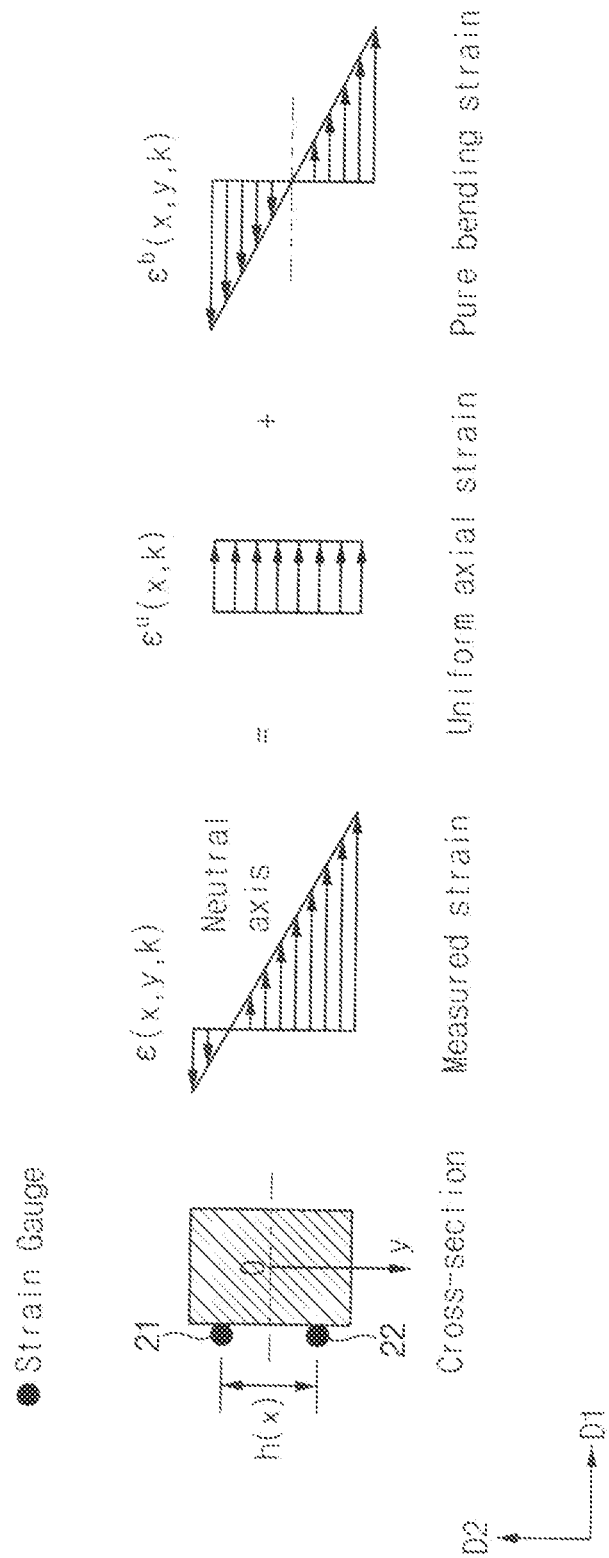
FIG. 4 illustrates a strain that is measured by one of a plurality of pairs of strain gauges installed in a bridge of FIG. 3.

FIG. 4 illustrates a strain that is measured by one of a plurality of pairs of strain gauges installed in a bridge of FIG. 3.

FIG. 4 illustrates a strain that is measured by a strain gauge installed at an arbitrary position in the bridge 10a of FIG. 3.

A pair of strain gauge may include a first strain gauge 21 and a second strain gauge 21 that is spaced apart from each other by a second distance h(x) in the second direction D2.

A sub strain ε(x, y, k) measured at an arbitrary position in the bridge 10a may include an axial sub strain $\varepsilon^a(x, k)$ that is uniform and a bending sub strain $\varepsilon^b(x, y, k)$ that varies linearly.

In FIG. 4, O denotes a center of a cross-section of the bridge 10a in the second direction D2.

A relationship between a strain and a displacement from the being strain is expressed by following Equation 1.

$$\varepsilon^b(x, y, k) = y\frac{d^2u(x, k)}{dx^2} \quad \text{[Equation 1]}$$

Here, u denotes a displacement of the bridge 10a in the second direction D2.

When each of the plurality of pairs of strain gauges includes a first strain gauge and a second strain gauge as illustrated with reference to FIG. 4, a difference between sub strains measured by the first strain gauge and the second strain gauge is expressed by following Equation 2.

$$\Delta\varepsilon(x, k) = h(x)\frac{d^2u(x, k)}{dx^2} \quad \text{[Equation 2]}$$

Here, Δε denotes a difference between sub strains, x denote a position in the first direction, k denotes k-th timing, u(x, k) denotes the first displacement and h(x) denotes the second distance.

The first displacement is expressed by following Equation 3.

$$u(x, k) = \sum_{j=1}^{L}\varphi_j(x)q_j(k) \quad \text{[Equation 3]}$$

Here, $\varphi_j$ denotes a j-th mode shape, $q_j$ denotes a j-th modal response and L denotes a number of modes.

When Equation 3 is input to Equation 2, following Equation 4 is obtained.

$$\Delta\varepsilon(x, k) = h(x)\sum_{j=1}^{L}\frac{d^2\varphi_j(x)}{dx^2}q_j(k) \quad \text{[Equation 4]}$$

Equation 4 is represented by vector representation by following Equation 5.

$$\Delta\varepsilon(k) = H\Phi q(k) \quad \text{[Equation 5]}$$

Equation 5 is satisfied by following Equation 6, Equation 7, Equation 8 and Equation 9.

$$\Delta\varepsilon(k)=[\Delta\varepsilon(x_1,k) \ldots \Delta\varepsilon(x_m,k)]^T_{1\times m} \quad \text{[Equation 6]}$$

Here, m denote the plurality of positions.

$$q(k) = [q_1(k) \ldots q_L(k)]^T_{1\times L} \quad \text{[Equation 7]}$$

$$\Phi = \begin{bmatrix} \dfrac{d^2\varphi_1(x_1)}{dx^2} & \cdots & \dfrac{d^2\varphi_L(x_1)}{dx^2} \\ \vdots & \ddots & \vdots \\ \dfrac{d^2\varphi_1(x_m)}{dx^2} & \cdots & \dfrac{d^2\varphi_L(x_m)}{dx^2} \end{bmatrix}_{m\times L} \quad \text{[Equation 8]}$$

$$H = \begin{bmatrix} h(x_1) & \cdots & 0 \\ \vdots & \ddots & \vdots \\ 0 & \cdots & h(x_m) \end{bmatrix}_{m\times m} \quad \text{[Equation 9]}$$

The modal response q(k) is deduced to following Equation 10 from Equation 5.

$$q(k)=(\Phi^T\Phi)^{-1}\Phi^T H^{-1}\Delta\varepsilon \quad \text{[Equation 10]}$$

When Equation 10 is input to Equation 3, the first displacement at the first position is expressed by following Equation 11.

$$u(k)=TH^{-1}\Delta\varepsilon(k) \quad \text{[Equation 11]}$$

Equation 11 is satisfied by following Equation 12 and Equation 13.

$$T=\Psi(x_d)[\Phi^T\Phi]^{-1}\Phi^T \quad \text{[Equation 12]}$$

$$\Psi=[\varphi_1(x_d) \ldots \varphi_L(x_d)]_{1\times L} \quad \text{[Equation 13]}$$

When a scaling factor α associated with compensating for a difference between an estimated mode shape of the bridge and a real mode shape of the bridge is introduced, the first displacement is expressed by following Equation 14.

$$u(k) = \frac{1}{\alpha(k)}T_a H^{-1}\Delta\varepsilon(k) \quad \text{[Equation 14]}$$

Here, $T_a$ is an approximation matrix of a matrix T.

A finite response pulse is expressed by a following Equation 15.

$$u^*=(\Delta t)^2(L^T L+\lambda^2 I)^{-1}L^T L_a a+\lambda^2(L^T L+\lambda^2 I)^{-1}u \quad \text{[Equation 15]}$$

Here, denotes u*vector representation of the final displacement, u denotes a vector representation of the first displacement transformed from the strain, a denotes a vector representation of the acceleration, La denotes (2N+1)-th order diagonal weight matrix, and λ denotes a normalizing factor that is satisfied by a following Equation 16.

$$\lambda=46.81(2N+1)^{-1.95} \quad \text{[Equation 16]}$$

Here, λ satisfied by a following Equation 17.

$$\lambda = 2N + 1 = \frac{2.68}{f_1 \Delta t} \quad \text{[Equation 17]}$$

Here, $f_1$ denotes a first natural frequency of the bridge 10a.

When a superposition is applied to Equation 15, following Equation 18 is deduced $$u^*(k)=C_H a+C_L u \quad \text{[Equation 18]}$$

Here, $C_H$ denotes a (N+1)-th row of $(\Delta t)^2(L^T L+\lambda^2 I)^{-1}L^T L_a$ and corresponds to a combination of a double integration and a high-pass filter and $C_L$ denotes a low-pass filter of $\lambda^2(L^T L+\lambda^2 I)^{-1}$.

The first displacement is expressed by a following Equation 19.

$$u_s=\{T_a H^{-1}\Delta\varepsilon\}^T \quad \text{[Equation 19]}$$

Here, the low frequency component and the first high frequency component of the first displacement is expressed by following Equation 20 and Equation 21.

$$u_s^l(k)=C_L u_s \quad \text{[Equation 20]}$$

$$u_a^h(k)=C_H a \quad \text{[Equation 21]}$$

The second high frequency component of the second displacement is expressed by a following Equation 22.

$$u_s^h(k)=u_s(k)-u_s^l(k) \quad \text{[Equation 22]}$$

When the scaling factor α(k) is applied to the first high frequency component of the first displacement, the second high frequency component of the second displacement is similar with the first high frequency component of the first displacement and the second high frequency component of the second displacement is expressed by a following Equation 23.

$$u_a^h(k) \approx \frac{1}{\alpha(k)}u_s^h(k) \quad \text{[Equation 23]}$$

When the scaling factor α(k) is estimated based on RLS algorithm, the scaling factor α(k) is expressed by a following Equation 24.

$$\alpha(k)=\alpha(k-1)+p(k)u_a^h(k)[u_s^h(k)-u_a^h(k)\alpha(k-1)] \quad \text{[Equation 24]}$$

Here, p(k) denotes relative weights assigned to a current measured value and a previous estimated value.

In Equation 24, p(k) is expressed by a following Equation 25.

$$p(k) = \frac{p(k-1)}{1 + p(k-1)[u_a^h(k)]^2} \quad \text{[Equation 25]}$$

When the estimated scaling factor α(k) is used for scaling the low frequency component of the first displacement, the estimated final displacement is expressed by a following Equation 26.

$$u^*(k) = \frac{1}{\alpha(k)}u_s^l(k) + u_a^h(k) = \frac{1}{\alpha(k)}C_L\{T_a H^{-1}\Delta\varepsilon\}^T + C_H a \quad \text{[Equation 26]}$$

Each of the plurality of pairs of strain gauges 20a, 20b, ..., 20m may measure the strain with a first sampling frequency and the accelerometer 30 may measure the acceleration with a second sampling frequency greater than the first sampling frequency. The first displacement transformed from the strain may be up-sampled using a cubic spline interpolation for matching the second sampling frequency. In addition, a low-pass Butterworth filter having a Nyquist cut-off frequency may be applied to the first high frequency component of the first displacement and the second high frequency component of the second displacement.

Referring to Equation 1 through Equation 26, the method of estimating displacement of a bridge according to example embodiments may estimate a displacement of a bridge more accurately because the scaling factor α(k) is estimated in a time domain instead of a frequency domain with using RLS algorithm in estimating a displacement and the estimated displacement and the estimated scaling factor are not affected by an accuracy of a natural frequency.

Figure 5:
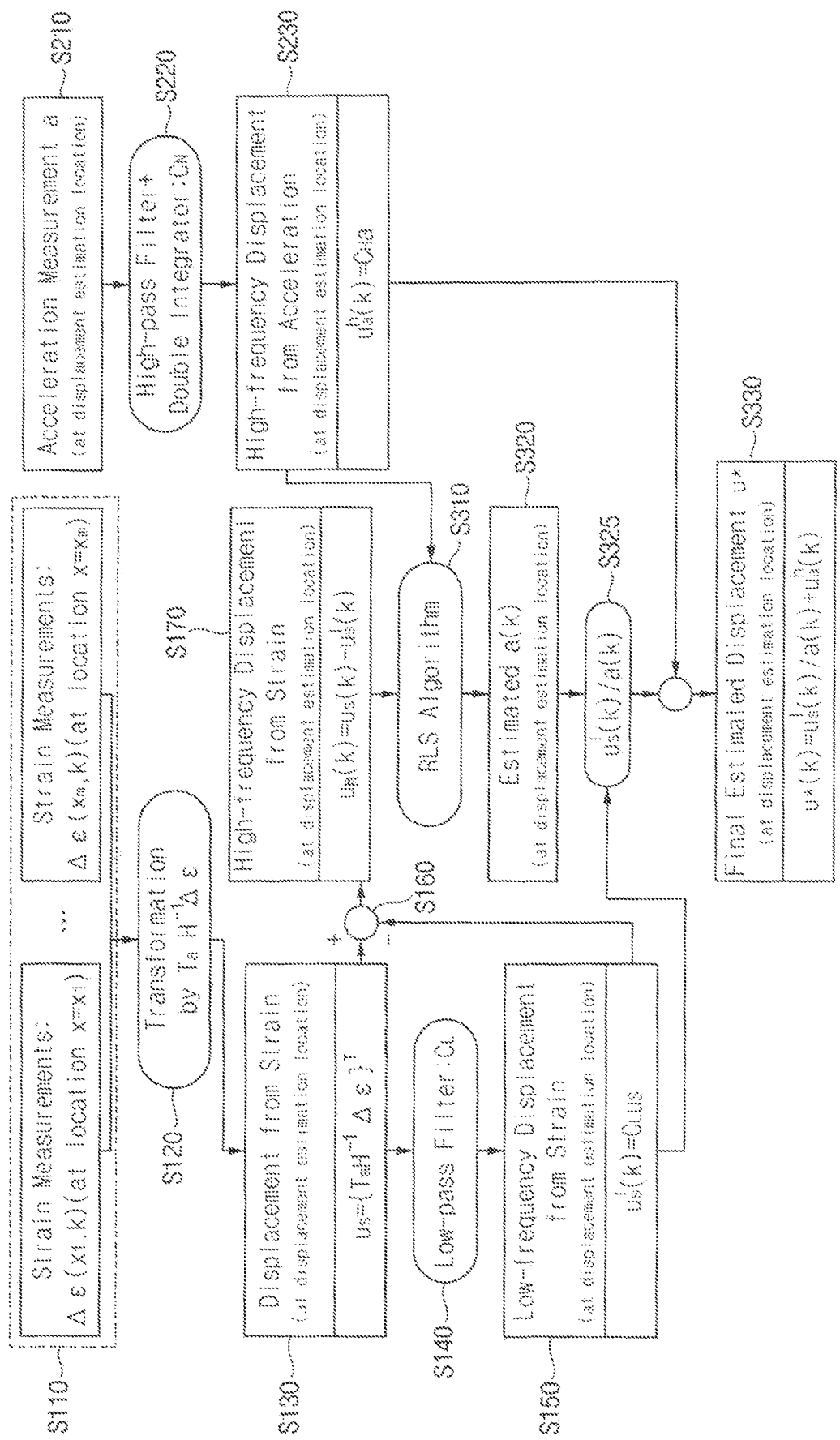
FIG. 5 is a flow chart illustrating a method of estimating displacement of a bridge of FIG. 2 in detain according to example embodiments.

FIG. 5 is a flow chart illustrating a method of estimating displacement of a bridge of FIG. 2 in detain according to example embodiments.

In FIG. 5, parameters measured or generated in each of operations are illustrated together.

Referring to FIG. 5, an operation (S320) of estimating the scaling factor α(k) and an operation (S325) of scaling the low frequency component of the first displacement based on the scaling factor α(k) are further included when compared with the method of FIG. 2.

Figure 6A:
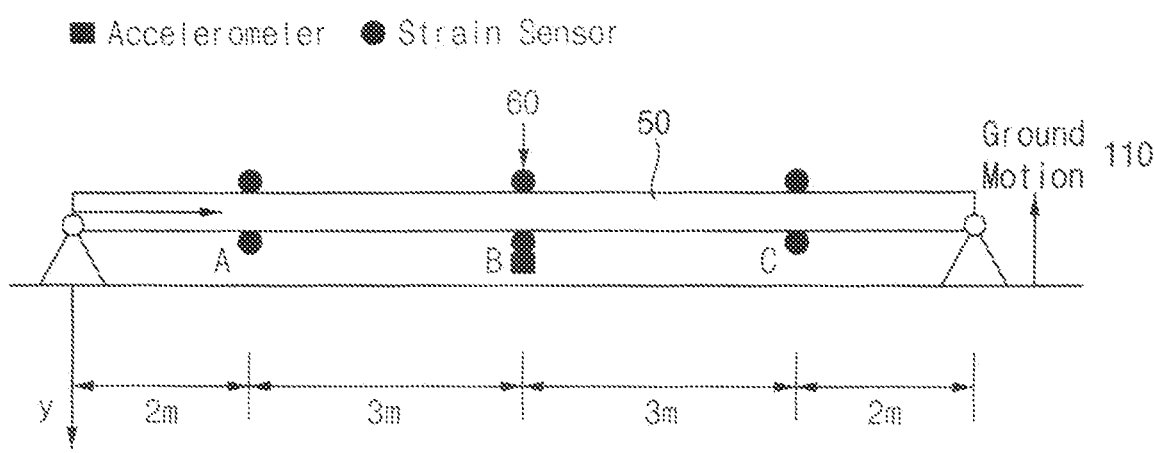
FIG. 6A illustrates a sample bridge to which a method of estimating displacement of a bridge according to example embodiments is applied and FIG. 6B illustrates a size of a cross-section of the sample bridge.
Figure 6B:
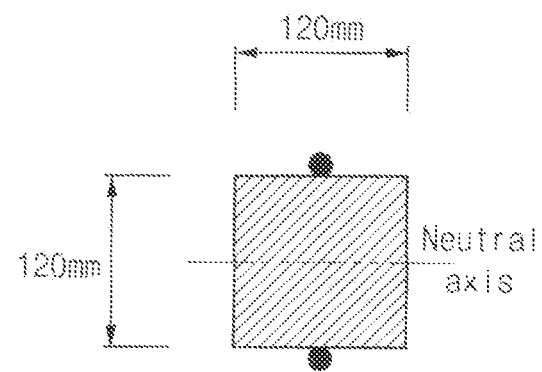

FIG. 6A illustrates a sample bridge to which a method of estimating displacement of a bridge according to example embodiments is applied and FIG. 6B illustrates a size of a cross-section of the sample bridge.

Referring to FIG. 6A, a sample bridge 50 has a length of 10 m, a plurality of pairs of strain gauges are installed at a plurality of positions spaced apart from a reference point by distances of 2 m, 5 m and 8 m, respectively, in the first direction D1 and an accelerometer is installed at a position 60 spaced apart from the reference point by a distance of 5 m in the first direction D1. At the position 60, a displacement of the sample bridge 50 is measured. In FIG. 6A, a reference numeral 110 indicates a ground motion signal.

Referring to FIG. 6B, the cross-section of the sample bridge 50 may have a size defined by 120 mm*120 mm.

Figure 7:
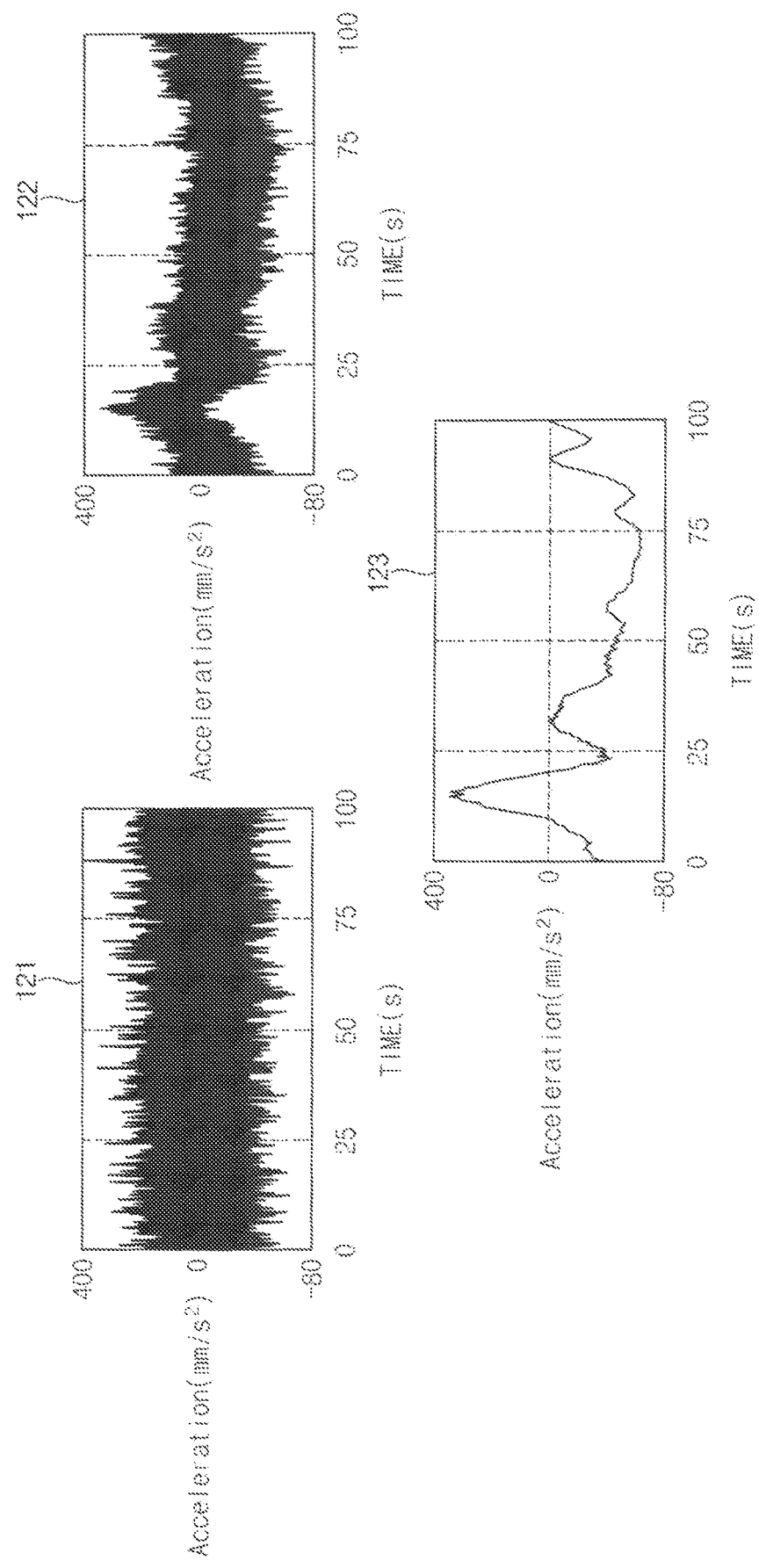
FIG. 7 illustrates ground motion signals applied to the sample bridge of FIG. 6A.

FIG. 7 illustrates ground motion signals applied to the sample bridge of FIG. 6A.

Referring to FIG. 7, ground motion signals 121, 122 and 123 having different accelerations are applied to the sample bridge 50.

Figure 8A:
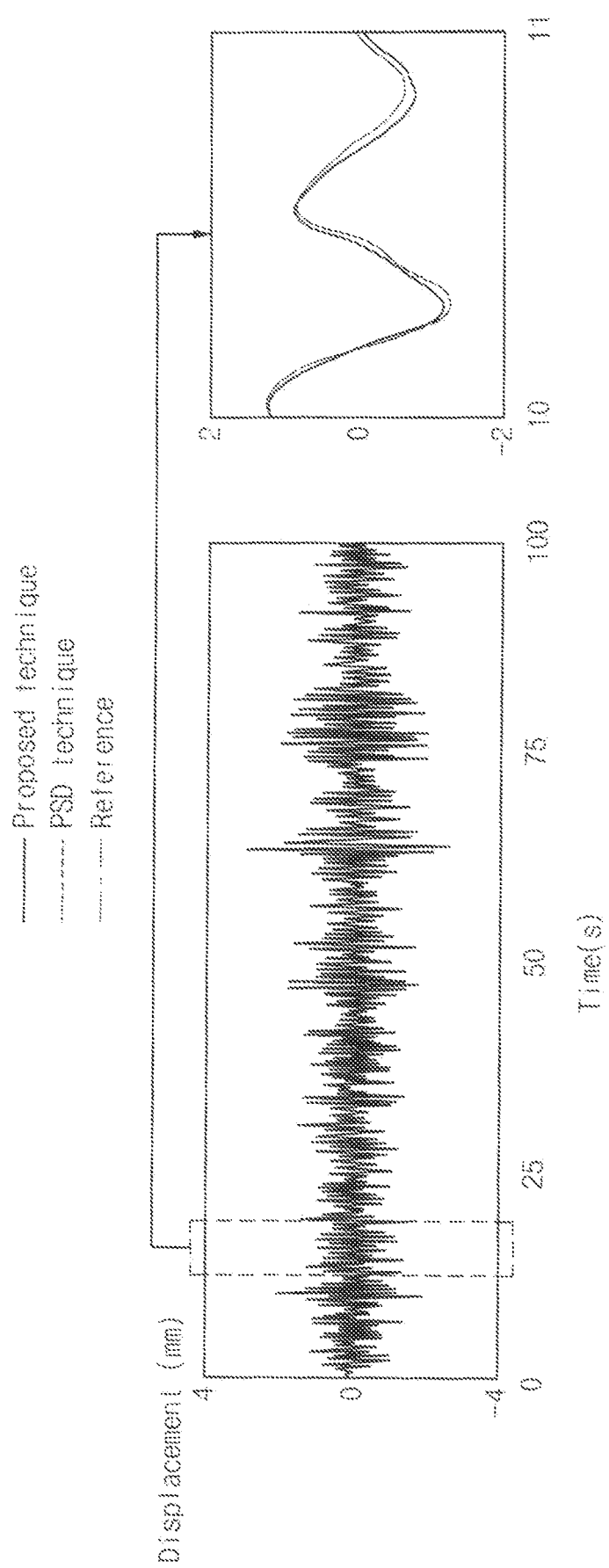
FIGS. 8A to 8C illustrate examples of estimated displacements when the ground motion signals in FIG. 7 are applied to the sample bridge of FIG. 6A, respectively.
Figure 8B:
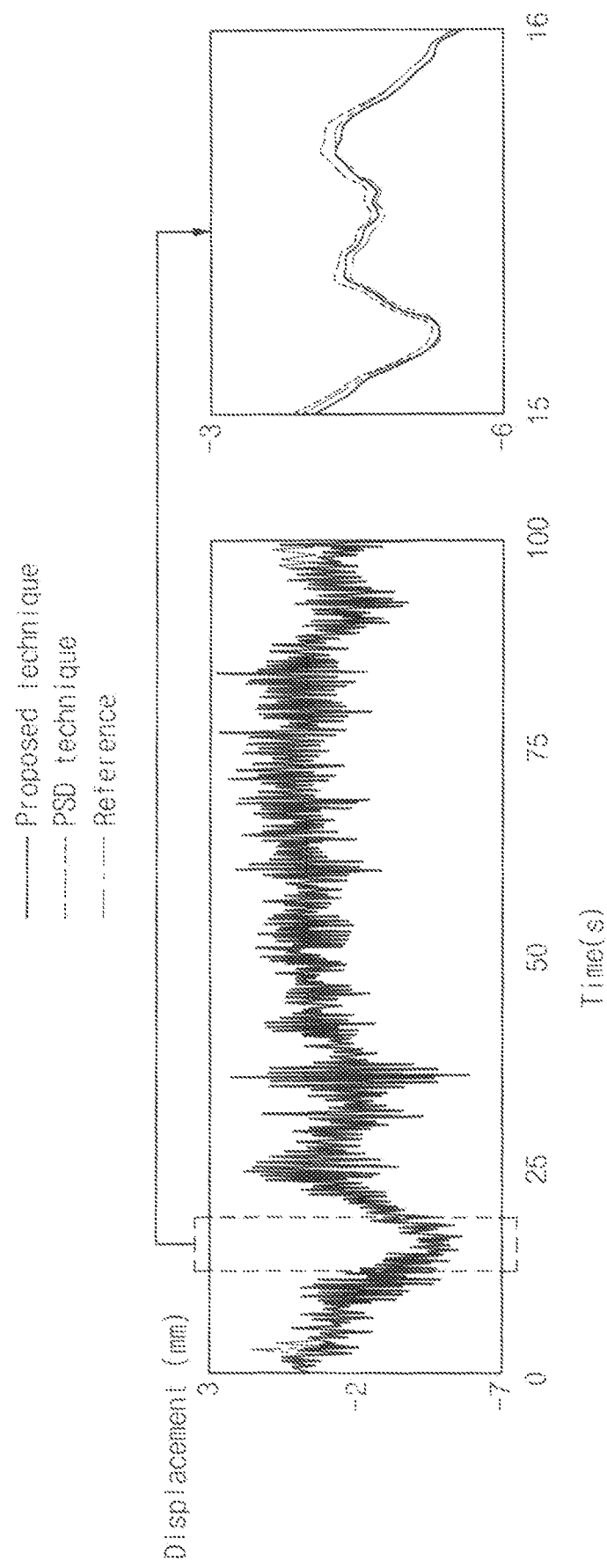
Figure 8C:
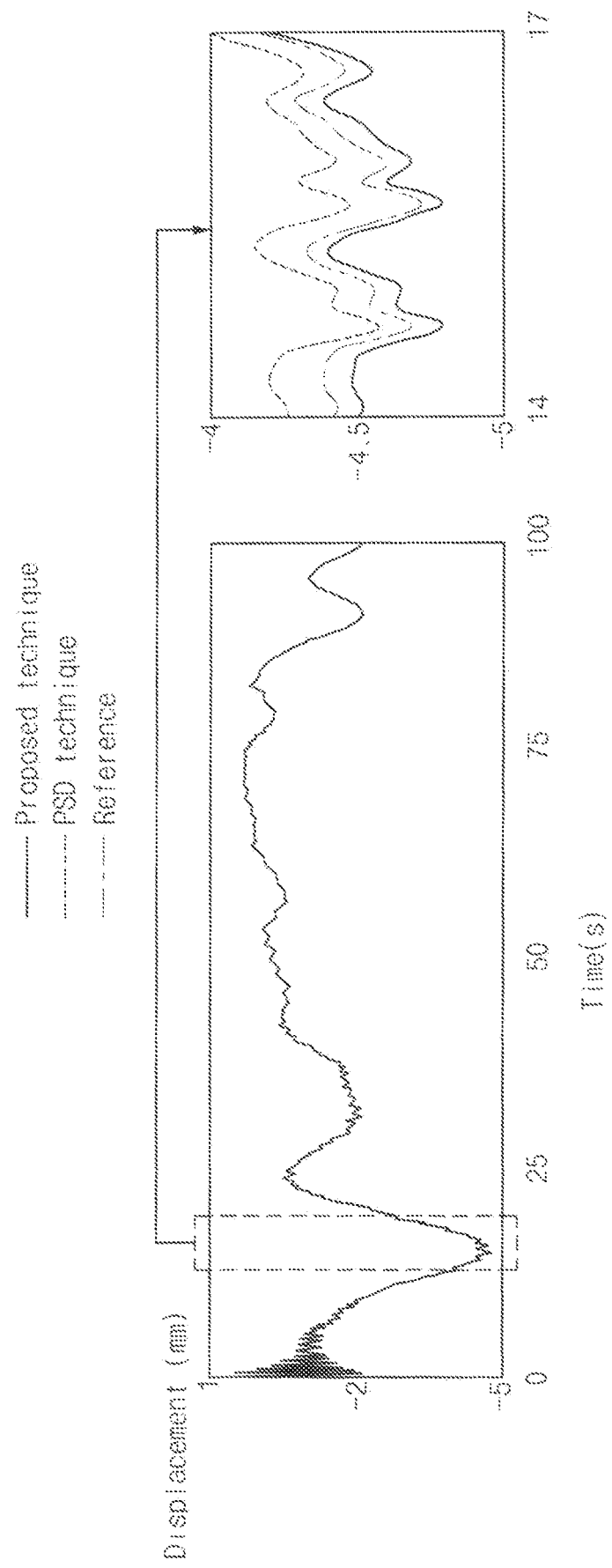

FIGS. 8A to 8C illustrate examples of estimated displacements when the ground motion signals in FIG. 7 are applied to the sample bridge of FIG. 6A, respectively.

Referring to FIGS. 8A to 8C, estimated displacement is illustrated when the ground motion signals 121, 122 and 123 in FIG. 7 are applied to the sample bridge 50 of FIG. 6A, respectively, along with a reference displacement Reference and an estimated displacement when a conventional technique is applied to the sample bridge 50.

In FIGS. 8A to 8C, it is assumed that the convention technique corresponds to a power spectral density (SPD) technique.

Referring to FIGS. 8A to 8C, it is noted that a difference between a displacement according to a method of the present disclosure and the reference value Reference becomes smaller than a difference between a displacement according to a method of the PSD technique and the reference value Reference as a change of the acceleration of the ground motion signal increases.

Figure 9:
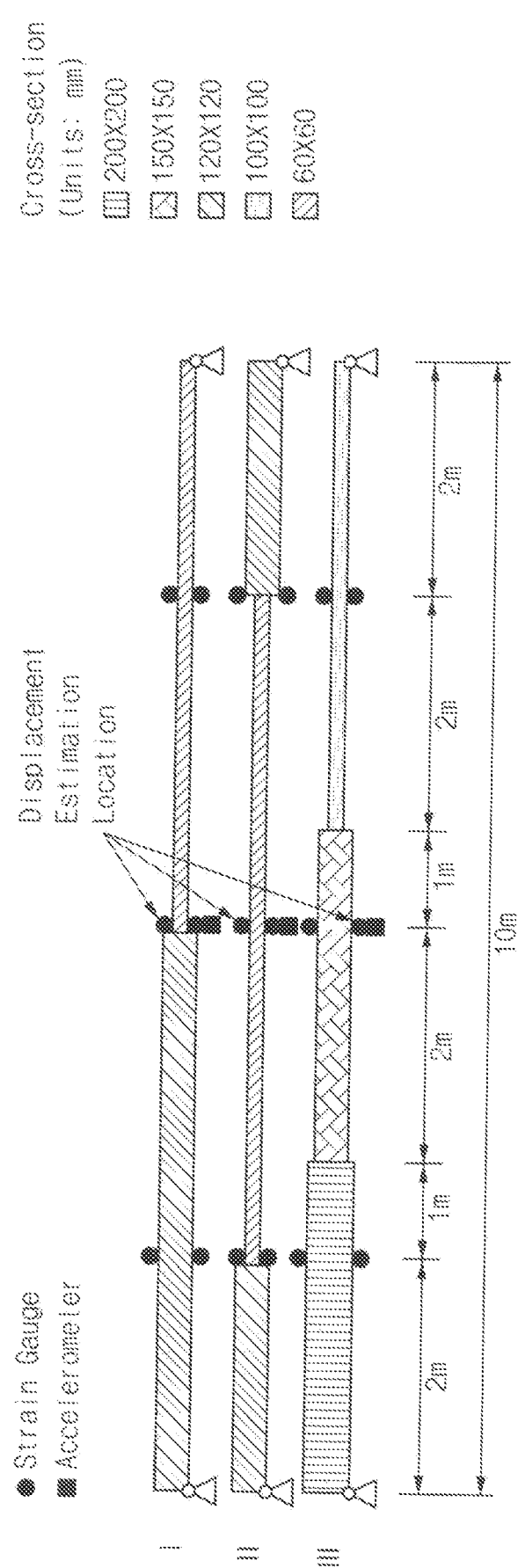
FIG. 9 illustrates examples of a sample bridge having a varying cross-section, to which a method of estimating displacement of a bridge according to example embodiments is applied.

FIG. 9 illustrates examples of a sample bridge having a varying cross-section, to which a method of estimating displacement of a bridge according to example embodiments is applied.

Figure 10:
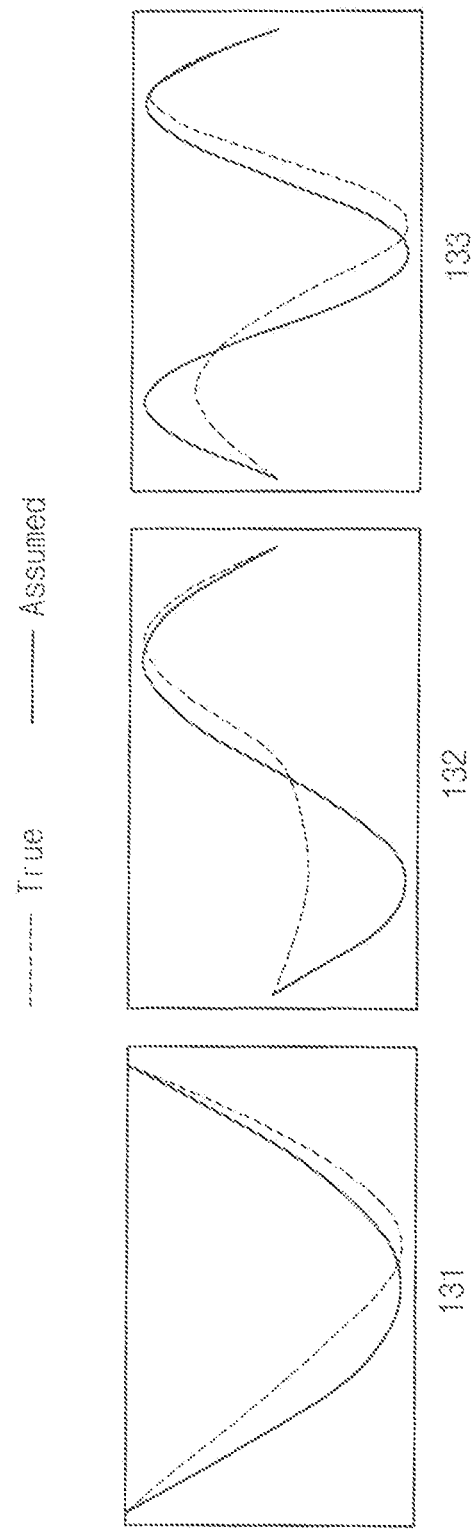
FIG. 10 illustrates a difference between a real mode shape and an estimated mode shape when a method of estimating displacement of a bridge according to example embodiments is applied to a first sample bridge in FIG. 9.

FIG. 10 illustrates a difference between a real mode shape and an estimated mode shape when a method of estimating displacement of a bridge according to example embodiments is applied to a first sample bridge in FIG. 9.

Referring to FIGS. 9 and 10, when a cross-section of a bridge varies as a first sample bridge I, it is noted that there is little difference between a real mode shape and an estimated mode shape in a first order 131 and a third order 133 and their there is a difference between the real mode shape and an estimated mode shape in a second order 132.

Figure 11:
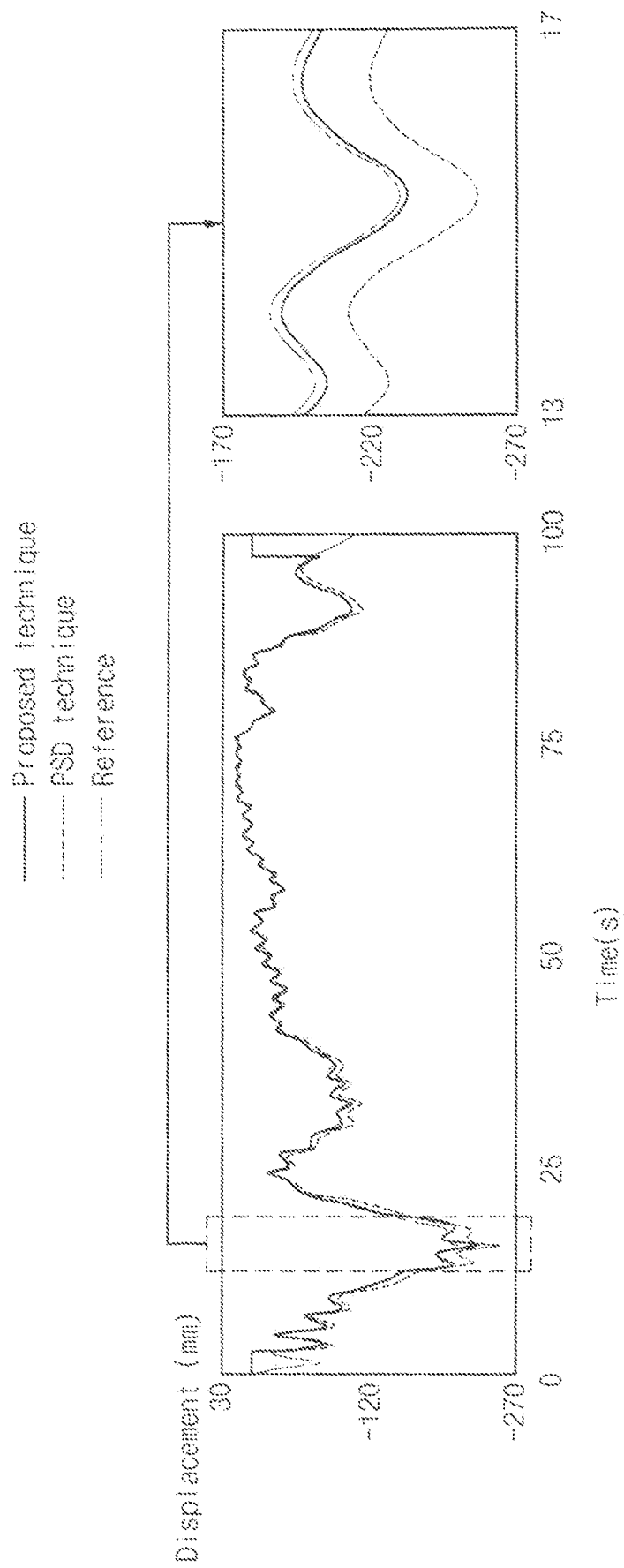
FIG. 11 illustrates that a method of estimating displacement of a bridge according to example embodiments is applied to a real bridge.

FIG. 11 illustrates that a method of estimating displacement of a bridge according to example embodiments is applied to a real bridge.

Referring to FIG. 11, it is noted that there is little difference between a displacement according to a method of the present disclosure and the reference value Reference and there is a difference between a displacement according to a method of the PSD technique and the reference value Reference in timing ranges from 13 second to 17 second.

Figure 12:
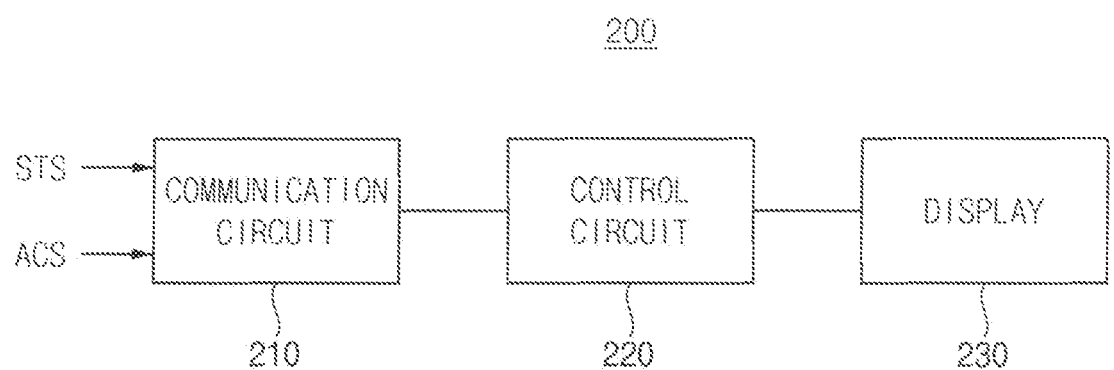
FIG. 12 is a block diagram illustrating an example of an electronic device to perform a method of estimating displacement of a bridge according to example embodiments.

FIG. 12 is a block diagram illustrating an example of an electronic device to perform a method of estimating displacement of a bridge according to example embodiments.

Referring to FIGS. 1 and 12, an electronic device 200 to estimate displacement of a bridge may include a communication circuit 210, a control circuit 220 and a display 230.

The communication circuit 210 may communicate with a plurality of pairs of strain gauges 20a, 20b, . . . , 20m that are installed at a plurality of positions x1, x2, xm in a first direction D1 from a reference point RP in a bridge 10 and an accelerometer 30 that is installed at a first position spaced apart from the reference point RP by a first distance xd in the first direction D1 in the bridge 10, may receive a strain STS that is measured by the plurality of pairs of strain gauges 20a, 20b, . . . , 20m and may receive and an acceleration ACS that is measured by the accelerometer 30.

The communication circuit 210 may typically include one or more modules which permit communications such as wireless communications between the electronic device 200 and a wireless communication system, communications between the electronic device 200 and another electronic device, communications between the electronic device 200 and an external server. Further, the communication circuit 210 may include a broadcast receiving module, a mobile communication module, a wireless Internet module, a short-range communication module, and a location information module.

The broadcast receiving module may receive a broadcast signal and/or broadcast associated information from an external broadcast managing entity via a broadcast channel. The broadcast channel may include a satellite channel, a terrestrial channel, or both. The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module.

The mobile communication module may transmit and/or receive wireless signals to and from one or more network entities. Examples of wireless signals transmitted and/or received via the mobile communication module include audio call signals, video (telephony) call signals, or various formats of data to support communication of text and multimedia messages.

The wireless Internet module may facilitate wireless Internet access. This module may be internally or externally coupled to the electronic device 200. The wireless Internet module may transmit and/or receive wireless signals via communication networks according to wireless Internet technologies. Examples of such wireless Internet access include Wireless LAN (WLAN), Wireless Fidelity (Wi-Fi), Wireless Broadband (WiBro), Worldwide Interoperability for Microwave Access (WiMAX), High Speed Downlink Packet Access (HSDPA), and the like.

The short-range communication module may facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module may detect, calculate, derive or otherwise identify a position of the electronic device 200. As an example, the location information module may include a Global Position System (GPS) module.

The control circuit 220 may receive the strain STS and the acceleration ACS from the communication circuit 210, may estimate a final displacement of the bridge based on the strain STS and the acceleration ACS according to a method of estimating displacement of a bridge and may display an estimated final displacement in the display 230.

The control circuit 220 may generate a first displacement including a low frequency component and a first high frequency component based on the strain STS, may generate a second displacement including a second high frequency component based on the acceleration ACS, may generate an unknown parameter associated with the displacement by applying a RLS algorithm to the first high frequency component of the first displacement and the second high frequency component of the second displacement and may generate the final displacement of the bride based on the unknown parameter, the low frequency component of the first displacement and the second high frequency component of the second displacement.

The present disclosure may be applicable to a method and a device to measure displacement of a bridge, variously.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the appended claims.

What is claimed is:

1. A method of estimating displacement of a bridge, the method comprising:
generating a first displacement including a low frequency component and a first high frequency component based on sub strains that are measured by a plurality of pairs of strain gauges installed at a plurality of positions in a first direction from a reference point, in a bridge;
generating a second displacement including a second high frequency component based on an acceleration that is measured by an accelerometer installed at a first position spaced apart from the reference point by a first distance in the first direction, in the bridge;
estimating a scaling factor based on the first high frequency component of the first displacement and the second high frequency component of the second displacement; and
generating a final displacement of the bridge based on the scaling factor, the low frequency component of the first displacement and the second high frequency component of the second displacement,
wherein the scaling factor is estimated by applying a recursive least square (RLS) algorithm to the first high frequency component of the first displacement and the second high frequency component of the second displacement in a time domain, and
wherein the plurality of pairs of strain gauges measure the sub strains with a first sampling frequency and the accelerometer measures the acceleration at a second sampling frequency greater than the first sampling frequency.

2. The method of claim 1, wherein generating the first displacement includes:
measuring the sub strains by the plurality of pairs of strain gauges;
transforming the sub strains into sub displacements;
generating the first displacement based on the sub displacements;
obtaining the low frequency component of the first displacement by applying a low-pass filter to the first displacement; and
obtaining the first high frequency component of the first displacement by extracting the low frequency component from the first displacement.

3. The method of claim 1, wherein generating the second displacement includes:
measuring the acceleration by the accelerometer;
double-integrating the acceleration; and
obtaining the second high frequency component of the second displacement by applying a high-pass filter to the double-integrated acceleration.

4. The method of claim 1, wherein generating the final displacement includes:
applying the RLS algorithm to the first high frequency component of the first displacement and the second high frequency component of the second displacement in the time domain;
estimating the scaling factor based on a result of the RLS algorithm; and
providing the final displacement by performing an operation based on the low frequency component of the first displacement, the scaling factor and the second high frequency component of the second displacement.

5. The method of claim 4, wherein the final displacement is obtained by:
dividing the low frequency component of the first displacement by the estimated unknown parameter; and
summing the second high frequency component of the second displacement to a result of the dividing.

6. The method of claim 4, wherein the estimated unknown parameter corresponds to a scaling factor associated with compensating for a difference between an estimated mode shape of the bridge and a real mode shape of the bridge.

7. The method of claim 1, wherein each of the plurality of pairs of strain gauges includes a first strain gauge and a second strain gauge that are spaced apart from each other at one of the plurality positions by a second distance in a second direction perpendicular to the first direction.

8. The method of claim 7, wherein a difference between the sub strains measured by the first strain gauge and the second strain gauge is expressed by following Equation 1, $$\Delta\varepsilon(x, k) = h(x)\frac{d^2 u(x, k)}{dx^2}, \quad \text{[Equation 1]}$$

wherein $\Delta\varepsilon$ denotes a difference between sub strains, x denote a position in the first direction, k denotes k-th timing, u (x, k) denotes the first displacement and h (x) denotes the second distance.

9. The method of claim 8, wherein the first displacement is expressed by following Equation 2, $$u(x, k) = \sum_{j=1}^{L} \varphi_j(x) q_j(k), \quad \text{[Equation 2]}$$

wherein $\varphi_j$ denotes a j-th mode shape, $q_j$ denotes a j-th modal response and L denotes a number of modes,
wherein when Equation 2 is input to Equation 1, following Equation 3 is obtained, $$\Delta\varepsilon(x, k) = h(x) \sum_{j=1}^{L} \frac{d^2 \varphi_j(x)}{dx^2} q_j(k). \quad \text{[Equation 3]}$$

10. The method of claim 9, wherein Equation 3 is represented by vector representation by following Equation 4, $$\Delta\varepsilon(k) = H\Phi q(k), \quad \text{[Equation 4]}$$

wherein Equation 4 is satisfied by following Equation 5, Equation 6, Equation 7 and Equation 8, $$\Delta\varepsilon(k) = [\Delta\varepsilon(x_1, k) \ldots \Delta\varepsilon(x_m, k)]^T_{1 \times m}; \quad \text{[Equation 5]}$$

wherein m denote the plurality of positions, $$q(k) = [q_1(k) \ldots q_L(k)]^T_{1 \times L}, \quad \text{[Equation 6]}$$

$$\Phi = \begin{bmatrix} \frac{d^2\varphi_1(x_1)}{dx^2} & \cdots & \frac{d^2\varphi_L(x_1)}{dx^2} \\ \vdots & \ddots & \vdots \\ \frac{d^2\varphi_1(x_m)}{dx^2} & \cdots & \frac{d^2\varphi_L(x_m)}{dx^2} \end{bmatrix}_{m \times L}, \quad \text{[Equation 7]}$$

$$H = \begin{bmatrix} h(x_1) & \cdots & 0 \\ \vdots & \ddots & \vdots \\ 0 & \cdots & h(x_m) \end{bmatrix}_{m \times m}, \quad \text{[Equation 8]}$$

wherein the modal response q (k) is deduced to following Equation 9 from Equation 4, $$q(k) = (\Phi^T \Phi)^{-1} \Phi^T H^{-1} \Delta\varepsilon(k). \quad \text{[Equation 9]}$$

11. The method of claim 10, wherein when Equation 9 is input to Equation 2, the first displacement at the first position is expressed by following Equation 10, $$u(k) = T H^{-1} \Delta\varepsilon(k), \quad \text{[Equation 10]}$$

wherein Equation 10 is satisfied by following Equation 11 and Equation 12, $$T = \Psi(x_d)[\Phi^T \Phi]^{-1} \Phi^T \quad \text{[Equation 11]}$$

$$\Psi = [\varphi_1(x_d) \ldots \varphi_L(x_d)]_{1 \times L}, \quad \text{[Equation 13]}$$

wherein when the scaling factor a associated with compensating for a difference between an estimated mode shape of the bridge and a real mode shape of the bridge is introduced, the first displacement is expressed by following Equation 13, $$u(k) = \frac{1}{\alpha(k)} T_a H^{-1} \Delta\varepsilon(k), \quad \text{[Equation 13]}$$

wherein, $T_a$ is an approximation matrix of a matrix T.

12. The method of claim 11, wherein when a finite response pulse is expressed by a following Equation 14, $$u^* = (\Delta t)^2 (L^T L + \lambda^2 I)^{-1} L^T L_a a + \lambda^2 (L^T L + \lambda^2 I)^{-1} u, \quad \text{[Equation 14]}$$

wherein u* denotes a vector representation of the final displacement, u denotes a vector representation of the first displacement transformed from the sub strains, a denotes a vector representation of the acceleration, La denotes (2N+1)-th order diagonal weight matrix, and $\lambda$ denotes a normalizing factor that is satisfied by a following Equation 15, $$\lambda = 46.81(2N+1)^{-1.95}, \quad \text{[Equation 15]}$$

wherein $\lambda$ is satisfied by a following Equation 16, $$\lambda = 2N + 1 = \frac{2.68}{f_1 \Delta t}, \quad \text{[Equation 16]}$$

wherein $f_1$ denotes a first natural frequency of the bridge, when a superposition is applied to Equation 14, following Equation 17 is deduced, $$u^*(k) = C_H a + C_L u, \quad \text{[Equation 17]}$$

wherein $C_H$ denotes a (N+1)-th row of $(\Delta t)^2 (L^T L + \lambda^2 I)^{-1} L^T L_a$ and corresponds to a combination of a double integration and a high-pass filter and $C_L$ denotes a low-pass filter of $\lambda^2 (L^T L + \lambda^2 I)^{-1}$.

13. The method of claim 12, wherein the first displacement is expressed by a following Equation 18, $$u_s = \{T_a H^{-1} \Delta\varepsilon\}^T, \quad \text{[Equation 18]}$$

wherein the low frequency component and the first high frequency component of the first displacement is expressed by following Equation 19 and Equation 20, $$u_s^l(k) = C_L u_s, \quad \text{[Equation 19]}$$

$$u_a^h(k) = C_H a, \quad \text{[Equation 20]}$$

wherein the second high frequency component of the second displacement is expressed by a following Equation 21, $$u_s^h(k) = u_s(k) - u_s^l(k) \quad \text{[Equation 21]}$$

wherein the estimated final displacement is expressed by a following Equation 22, $$u^*(k) = \frac{1}{\alpha(k)} u_s^l(k) + u_a^h(k) = \frac{1}{\alpha(k)} C_L \{T_a H^{-1} \Delta\varepsilon\}^T + C_H a, \quad \text{[Equation 22]}$$

wherein a(k) denotes the scaling factor.

14. The method of claim 1, wherein the final displacement corresponds to a displacement of the bridge at the first position.

15. The method of claim 1,
wherein the first displacement is up-sampled using a cubic spline interpolation.

16. A method of estimating displacement of a bridge, the method comprising:
measuring sub strains by a plurality of pairs of strain gauges installed at a plurality of positions in a first direction from a reference point, in a bridge;
transforming the sub strains into sub displacements;
generating a first displacement based on the sub displacements;
obtaining a low frequency component of the first displacement by applying a low-pass filter to the first displacement;
obtaining a first high frequency component of the first displacement by extracting the low frequency component from the first displacement;
measuring an acceleration by an accelerometer installed at a first position spaced apart by a first distance from the reference point in the first direction, in the bridge;
double-integrating the measured acceleration;
obtaining a second high frequency component of the second displacement by applying a high-pass filter to the double-integrated acceleration;
estimating a scaling factor based on the first high frequency component of the first displacement and the second high frequency component of the second displacement; and
generating a final displacement of the bridge by performing an operation based on the low frequency component of the first displacement, the scaling factor and the second high frequency component of the second displacement,
wherein the scaling factor is estimated by applying a recursive least square (RLS) algorithm to the first high frequency component of the first displacement and the second high frequency component of the second displacement in a time domain, and
wherein the plurality of pairs of strain gauges measure the sub strains with a first sampling frequency and the accelerometer measures the acceleration at a second sampling frequency greater than the first sampling frequency.

17. An electronic device configured to estimate displacement of a bridge, the electronic device comprising:
a communication circuit configured to communicate with a plurality of pairs of strain gauges and an accelerometer and configured to receive a strain that is measured by the plurality of pairs of strain gauges and an acceleration that is measured by the accelerometer, wherein the plurality of pairs of strain gauges are installed at a plurality of positions in a first direction from a reference point, in the bridge and the accelerometer is installed at a first position spaced apart by a first distance from the reference point in the first direction, in the bridge;
a control circuit configured to receive the strain and the acceleration from the communication circuit and configured to estimate a final displacement of the bridge based on the strain and the acceleration; and
a display configured to receive the estimated final displacement from the control circuit and configured to display the estimated final displacement,
wherein the control circuit is configured to:
generate a first displacement including a low frequency component and a first high frequency component based on the strain;
generate a second displacement including a second high frequency component based on the acceleration;
estimate a scaling factor based on the first high frequency component of the first displacement and the second high frequency component of the second displacement; and
generate the final displacement of the bride based on the scaling factor, the low frequency component of the first displacement and the second high frequency component of the second displacement,
wherein the control circuit is further configured to estimate the scaling factor by applying a recursive least square (RLS) algorithm to the first high frequency component of the first displacement and the second high frequency component of the second displacement in a time domain, and
wherein the plurality of pairs of strain gauges measure the sub strains with a first sampling frequency and the accelerometer measures the acceleration at a second sampling frequency greater than the first sampling frequency.

* * * * *